Figure 1:
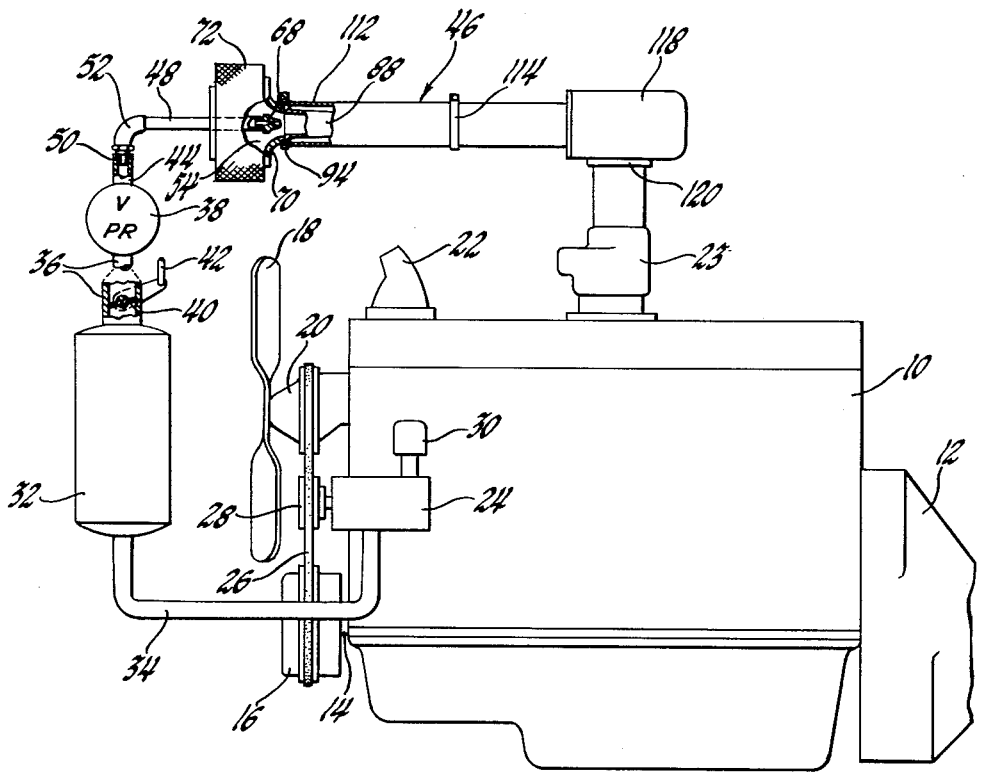

May 9, 1961 W. H. PERCIVAL 2,983,267
ACCUMULATOR SUPERCHARGING
Filed April 24, 1959 2 Sheets-Sheet 1

INVENTOR.
Worth H. Percival
BY
L. D. Burch
ATTORNEY

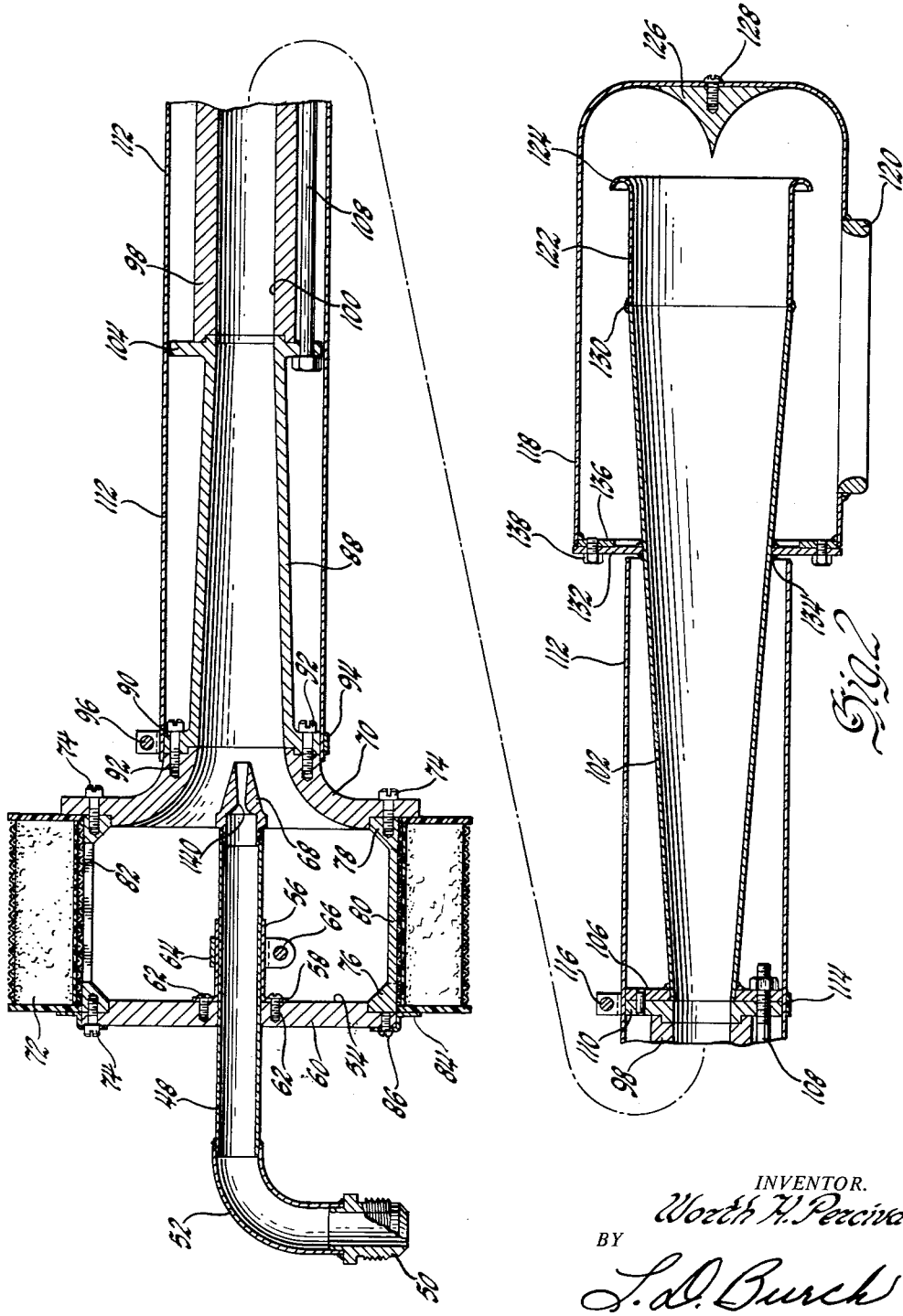

United States Patent Office 2,983,267
Patented May 9, 1961

2,983,267
ACCUMULATOR SUPERCHARGING
Worth H. Percival, St. Clair Shores, Mich., assignor to General Motors Corporation, Detroit, Mich., a corporation of Delaware
Filed Apr. 24, 1959, Ser. No. 808,732
5 Claims. (Cl. 123—119)

This invention relates to supercharging of internal combustion engines and more particularly to the type of supercharging which is intermittent, that is, utilized only during periods of peak power demand of the internal combustion engine. This device is an improvement over the copending application, Serial No. 779,715, filed December 11, 1955.

Supercharging of internal combustion engines is well known in the automotive field, as are various applications of intermittent engine supercharging. In the operation of a motor vehicle there are many instances when the power demand of the engine is at its peak, or where short bursts of power are necessary, such as rapid acceleration, passing, hill climbing, and the like. The general method of supercharging comprises a means of conveying compressed air to the intake manifold of the engine, the passage of the compressed air being controlled in some manner by the vehicle operator or some other suitable means. In the past, intermittent supercharging has required the use of cumbersome and complicated structures, quite expensive to manufacture and use in a motor vehicle. The compressed air is conveyed directly to the engine intake manifold, the intricate valving assemblies being relied on to provide intermittent supercharging. Thus, the compressor is required to operate at all times and the period of supercharging available at any particular time is quite short. The engine compartment of the normal automobile is relatively restricted in regard to space, and with today's design trends, the available space is becoming less and less. This makes the generally available supercharging structure unadaptable to the modern automobile because of its size and complication. Intermittent supercharging has been used in the past with relatively large internal combustion engines and it has never become feasible to produce the necessary complicated structures for general use.

The device in which this invention is embodied comprises an air compressor assembly, a compressed air accumulator and an improved ejector assembly which feeds the compressed air to the engine. The construction is relatively simple and uncomplicated, thus allowing the device to be mounted in the normal restricted automobile engine compartment. The device may utilize certain parts of the conventional automobile, such as the air suspension air compressor or the like, and is most advantageous when used in an engine of relatively small size. A smaller engine is adequate for normal motor vehicle operation and, when supercharged, provides the necessary power output needed at various times to make such a smaller engine compare in performance with a larger unsupercharged engine. By utilizing this device the quantity of compressed air stored in the accumulator will last much longer in the over-all vehicle operation, that is, the supercharging period can be increased over that available if the air were piped directly to the engine intake system. This is particularly advantageous when using a small engine, since vehicle economy can be obtained for normal operation and the supercharging is available during periods of peak power demand.

The improved air ejector assembly includes a converging-diverging mixing tube communicating with the vehicle carburetor, and has primary and secondary air supplies discharging into its forward end. The primary air is conveyed from the accumulator and passes through a nozzle, so constructed as to raise the velocity of the air to supersonic. The secondary air inlet draws air at atmospheric pressure through a cleaner and silencer assembly for mixing in the tube with the primary air. The ratio of the throat area of the mixing tube to the throat area of the nozzle varies from approximately 25:1 to approximately 50:1 depending on the type of engine, the vehicle, the transmission, the speed range and the supercharging pressure. The converging portion of the mixing tube is provided with approximately 4° slope, greatly improving the efficiency of the mixing tube over a straight tube.

These and other advantages will become more apparent from the following description and drawings in which:

Figure 1 diagrammatically illustrates a supercharging system containing the improved air ejector assembly.

Figure 2 is a cross-sectional view of the air ejector assembly shown in Figure 1.

Referring more particularly to the drawing, an internal combustion engine 10 is illustrated. It is not necessary that the engine 10 be the typical automobile engine but could as well be a commercial vehicle such as a truck, bus, or off-road equipment. A conventional transmission and clutch assembly 12 may be mounted on the engine to drive the vehicle, and the usual crank shaft 14 extends through the engine and is driven thereby. The crank shaft has a pulley 16 mounted thereon, conventionally used to drive the cooling fan 18 through the fan pulley 20. A cooling water outlet 22 is provided to return engine cooling water to the radiator to be cooled by the fan 18. A conventional carburetor 23 may be mounted on the engine, as in the normal vehicle, the carburetor 23 communicating with the engine intake manifold to convey the air and gas mixture to the engine cylinders for combustion.

An air compressor 24 is mounted in the vehicle engine compartment in a suitable manner such that the compressor may be driven by the fan belt 26 through the pulley 28. The compressor could be of the piston pump type, having two or more stages, to compress air from atmospheric pressure to some predetermined level as between 1,000 and 3,000 p.s.i.a. If a final pressure above this range is desired, further stages may be added to the compressor.

The compression processes should approach isothermal conditions, such conditions being the most desirable as requiring the least amount of work. The type of compressor presently being installed in motor vehicles for air suspension or the like could be utilized for the first stage of compression required in the over-all unit. For example, it would be feasible to utilize the excess air not required for the air suspension system by conveying such air to another compressor to be raised to the required storage pressure. The compressor may also be a single unit, as shown for illustration purposes in the drawing.

The compressor, as illustrated, is driven by the crank shaft 14 through the pulley 16, the belt 26 and the pulley 28. However, the compressor could just as well be driven by another source, such as a separate small internal combustion engine or an electric motor powered from the battery, or could as well be driven from any part of the drive line, such as the transmission power take-off gear. In other words, any suitable method of driving the compressor is sufficient.

An air cleaner 30 is mounted on the air compressor, which is generally a standard unit on most commercial compressors. The air compressor 24 may further be provided with an unloading device, either of the valve type or the clutch type, to disconnect the compressor when its use is unnecessary.

An accumulator 32 is located in a convenient space, either in the engine compartment or elsewhere in the vehicle, and is shown in the drawing as being a cylindrical tank. The accumulator may be any convenient shape such as a cylinder, sphere, length of coiled tube, or the like, and may be of any suitable material sufficient to contain compressed air of the pressures desired. The accumulator should not be insulated since insulation would prevent heat transfer to and from the atmosphere. During the filling cycle of the accumulator, from the air compressor 24, it is desired to keep the air cool, and during the expansion of the compressed air it is desired to keep the air from becoming too cold. Heat transfer is thus necessary in order to maintain the proper balance in the system.

A conduit 34 communicates between the air compressor 24 and the lower end of the accumulator 32 to convey air from the air compressor for storage in the accumulator. An outlet conduit 36 communicates with a pressure regulator 38, the pressure regulator maintaining a predetermined pressure at the accumulator outlet. A valve 40, located in the outlet conduit 36, is adaptable to control the outlet of air from the accumulator, the valve 40 being operated by a suitable linkage 42, which may be connected to the accelerator pedal linkage or to the carburetor throttle control linkage. The valve may be operated by a solenoid as well, the solenoid being actuated by some position of the normal vehicle throttle or by the carburetor linkage. The valve 40 may be actuated by the motor vehicle operator for supercharging at the operator's desire. A conduit 44 extends from the pressure regulator to the ejector assembly, illustrated generally by the numeral 46.

The air ejector assembly is best illustrated in Figure 2. The primary air inlet has a conduit 48, secured to the outlet conduit 44 from the pressure regulator 38 by a threaded pipe fitting 50 and an elbow 52. The conduit 48 is received in the air inlet chamber 54 and secured therein by a cylindrical sleeve 56. A flange 58, at the end of the sleeve 56 is secured to the housing plate 60, as by machine screws 62. A strap clamp 64, received about the sleeve 56 and the conduit 48, extends to the side of the housing and is secured thereto, as by the machine screw 66. A nozzle block 68 is threaded into the end of the conduit 48 and is so constructed as to raise the velocity of air passing therethrough to supersonic.

The inlet housing 58 is formed by the plate 60 and a bellmouth housing 70, opposite thereto. An air cleaner and silencer assembly 72 is secured to the bellmouth housing 70 and to the plate 60 by the bolts 74, received in the annular flanges 76 and 78 of the cylindrical member 80. The member 80 has a plurality of apertures 82 formed therein to permit the entraining of air through the cleaner and silencer assembly 72. A sheet metal flange 84 is secured to the air cleaner and silencer assembly 72 and is attached to the plate 60 by machine screws 86, to aid in the retention of the assembly 72.

The bellmouth housing 70, enclosing the nozzle 68, is secured to the converging portion 88 of the ejector assembly 46. The converging section 88 has a bolt flange 90 in the inlet end and abuts the bellmouth housing 70. A plurality of bolts 92, passing through the flange 90 and received in the bellmouth housing 70, secure the parts together. A strap retaining clamp 94 is secured to some convenient portion of the motor vehicle through a bolt, or the like, 96.

A throat section 98 is secured to the converging section 88 and has a cylindrical internal bore 100 acting as a throat for the converging-diverging tube. Secured to the opposite end of the throat section 98 is the diverging, or diffusing, section 102. A bolt and spacer flange 104, formed on the outlet end of the converging section 88, and a corresponding spacer and bolt flange 106, in the inlet end of the diverging section 102, receive a plurality of tie bolts 108, thus clamping the throat section 98 between the ends of the converging section 88 and a diverging section 102. A separate flange member 110, disposed between the throat section 98 and the flange 106 of diverging section 102, provides a proper joint between the two sections.

Enclosing the converging section 88, the throat area 98 and a portion of the diverging section 102, is an outer tube or casing 112, properly spaced from the converging-diverging tube by the flanges 104, 106, and 110. The casing 112 is secured at the inlet end by the strap retaining member 94 and by a similar member 114 adjacent the junction of the throat section 98 and the diverging portion 102. A bolt 116 secures the strap retainer 114 to a convenient portion of the motor vehicle.

Enclosing the remaining portion of the diverging section 102 is a housing 118 which has an annular connecting ring 120 received in the vehicle carburetor 23. The diverging section 102 terminates in a cylindrical section 122, having a rolled flange 124 at the extreme end to aid in directing the flow of mixed air through the mixing tube to the carburetor inlet 120. A flow directing block 126, secured in the end of the housing 118 by a machine screw 128, also aids in directing the flow. The cylindrical section 122 may be formed from the same piece of material as the diverging section 102 or may be formed from a separate piece and attached to the diverging section 102, as by the weld 130.

A flange 132, secured to the diverging section 102 as by weld 134, abuts an inturned flange 136 formed at the inlet end of the housing 118. A ring of bolts 138 secure the two flanges together, thus retaining the housing 118 in proper location with respect to the diverging portion 102.

The area of the cylindrical throat section 100 is of such dimensions as to have a throat area ratio, with respect to the throat 140 of the nozzle 68, somewhere between 25:1 and 50:1. The proper ratio within this range depends upon the type of engine employed, the characteristics of the vehicle on which it is used, the type of transmission used in the vehicle, the speed range within which the engine is to be supercharged, and the actual supercharging pressure.

In the operation of the motor vehicle, the air compressor 24 is allowed to build up a certain amount of compressed air, at a predetermined pressure, in the accumulator 32. The valve member 40 is normally closed and normal aspiration of the engine is accomplished by secondary air at atmospheric pressure entrained through the air filter and silencer assembly 72, through the mixing tube and to the carburetor 23. When the motor vehicle operator requires greater power than normal aspiration can give, outlet valve 40 from the accumulator 32 is actuated through the linkage 42 to permit compressed air to pass through the conduit 36, the pressure regulator 38 and the outlet conduit 44 into the primary air conduit 48. The air passes through the nozzle 68 at supersonic velocity and entrains approximately twice its volume of air at atmospheric pressure through the cleaner and silencer assembly 72. The air from the accumulator varies in pressure from 100 to 200 p.s.i., depending on the rate at which the engine is using the air supply, as determined by the speed of the engine. The primary and secondary air are mixed in the converging-diverging mixing tube and delivered to the carburetor 23 at approximately four to eight inches of mercury above atmospheric pressure to provide proper supercharging.

Thus, an uncomplicated and inexpensive method of engine supercharging is provided which gives added power to an internal combustion engine during the periods of power demand when normal operation or aspiration of the engine is insufficient.

What is claimed:

1. Air ejector means communicating with an internal combustion engine through a carburetor mounted on said engine for supercharging said engine during periods of peak power demand and comprising a carburetor inlet housing, a converging-diverging mixing tube discharging into said housing, an inlet housing adjacent the opposite end of said mixing tube from said carburetor housing, a primary air inlet in said inlet housing for discharging compressed air into said mixing tube, a nozzle secured in said primary air inlet, said nozzle and said mixing tube having a throat area ratio of from 1:25 to 1:50, and secondary air inlet means in said inlet housing for entraining air at atmospheric pressure into said mixing tube to mix with the compressed air from primary air inlet, said primary air and said secondary air being conveyed to said carburetor and to said engine for supercharging said engine.

2. Air ejector means for use in supercharging an internal combustion engine having a carburetor and a source of compressed air, a converging-diverging mixing tube communicating with said carburetor, primary air inlet means discharging compressed air from said compressed air source into said mixing tube, a nozzle secured in said primary air inlet means, said mixing tube and said nozzle having a throat area ratio of from 25:1 to 50:1, and secondary air inlet means discharging atmospheric air into said mixing tube, said compressed air and said atmospheric air being mixed in said mixing tube and conveyed thereby to said carburetor and to said engine for supercharging said engine.

3. An air ejector means set forth in claim 2 and having control means operatively connected therewith for admitting compressed air to said mixing tube and to said carburetor only during periods of peak power demand.

4. The air ejector means set forth in claim 2 wherein the throat area of said nozzle is of such size as to discharge compressed air from said nozzle at supersonic velocities.

5. An ejector means for use in supercharging an internal combustion engine having a carburetor and a source of compressed air and compressing a converging-diverging mixing tube communicating with said carburetor, first air inlet means connected with said mixing tube for entraining air at atmospheric pressure for normal unsupercharged operation of said engine, second air inlet means communicating with said mixing tube, control means associated with said second air inlet means for permitting air passage therethrough from said compressed air source during periods of peak power demand of said engine, a nozzle in said second air inlet means for raising the velocity of the air passing therethrough to supersonic, said converging-diverging mixing tube and said nozzle having a throat area ratio of from 25:1 to 50:1, and said compressed air passing through said second inlet means entraining substantially two times its volume of atmospheric air from said first air inlet means for proper supercharging of said engine.

References Cited in the file of this patent

UNITED STATES PATENTS

| | | |
|---|---|---|
| 1,746,309 | Herier | Feb. 11, 1930 |
| 1,765,278 | La Vergne | June 17, 1930 |

FOREIGN PATENTS

| | | |
|---|---|---|
| 97,371 | Austria | Feb. 15, 1924 |
| 710,105 | France | Aug. 19, 1931 |
| 833,877 | Germany | Mar. 13, 1952 |